United States Patent [19]

Kōjiro et al.

[11] Patent Number: 4,553,812

[45] Date of Patent: Nov. 19, 1985

[54] PENETRATION ASSEMBLY FOR BRINGING AN OPTICAL FIBER CABLE THROUGH A VESSEL WALL

[75] Inventors: Tetsuya Kōjiro, Kobe; Jun Takeda, Akashi, both of Japan

[73] Assignee: Mitsubishi Denki Kabushiki Kaisha, Tokyo, Japan

[21] Appl. No.: 500,912

[22] Filed: Jun. 3, 1983

[30] Foreign Application Priority Data

Jun. 8, 1982 [JP] Japan ................... 57-99899

[51] Int. Cl.$^4$ ............................... G02B 7/16
[52] U.S. Cl. .................... 350/96.20; 350/96.21
[58] Field of Search ............ 350/96.20, 96.21, 96.22

[56] References Cited

U.S. PATENT DOCUMENTS

| 3,946,467 | 3/1976 | Lukas et al. | 350/96.20 |
| 4,124,364 | 11/1978 | Dalgoutte | 350/96.21 |
| 4,379,614 | 4/1983 | Liertz | 350/96.21 |

FOREIGN PATENT DOCUMENTS

| 0009453 | 1/1977 | Japan | 350/96.21 |
| 0007251 | 1/1978 | Japan | 350/96.21 |
| 0156809 | 1/1981 | Japan | 350/96.20 |
| 7811931 | 6/1979 | Netherlands | 350/96.21 |

Primary Examiner—William L. Sikes
Assistant Examiner—Akm E. Ullah
Attorney, Agent, or Firm—Wenderoth, Lind & Ponack

[57] ABSTRACT

A penetration assembly for an optical fiber cable includes a pair of axially-aligned cylindrical sleeves surrounding an optical fiber cable. An air-tight seal is formed between the optical fiber cable and the sleeves by means of glass connectors connected to the optical fiber cable and flexible metal connectors connected between the glass connectors and the inside of the sleeves. Each glass connector comprises a plurality of cylindrical sections each having a different coefficient of thermal expansion having a value between that of the optical fiber cable and that of the flexible metal connector. The coefficient of thermal expansion of the glass connector changes in a step-wise manner from the section connected to the optical fiber cable to the section connected to the flexible metal connector. This step-wise change in coefficient of thermal expansion reduces the thermal stresses exerted on each section and prevents cracks due to thermal stress, a common problem with the resinous materials presently used to form airtight seals in penetration assemblies. Since the air-tight seal between the optical fiber cable and the sleeves is formed from glass and metal, it is more resistant to radiation than presently used seals formed from resinous materials.

11 Claims, 4 Drawing Figures

PENETRATION ASSEMBLY FOR BRINGING AN OPTICAL FIBER CABLE THROUGH A VESSEL WALL

BACKGROUND OF THE INVENTION

The present invention relates to a penetration assembly for sealingly bringing cables such as optical fiber cables through the wall of a containment vessel of a nuclear power plant in a manner so as to prevent gas flow from the containment vessel to the atmosphere.

FIG. 1 shows one presently used type of penetration assembly suitable for installation in the wall of a containment vessel of a nuclear power plant. In the figure, an optical fiber cable 1 is passed through a containment vessel wall (wall not shown). A metal pipe 2 surrounds and physically protects the optical fiber cable 1. A seal material 3 is disposed inside the pipe 2 about the cable 1 for the purpose of creating an air-tight seal. A flange is provided with through holes through which pass the pipe 2, and a seal material 5 fills the space between the flange 4 and the pipe 2 and forms an air-tight seal. Both of the seal materials 3 and 5 usually comprise an epoxy resin or silicone resin.

This type of penetration assembly has a number of problems. The first problem is related to the continuous cycle of heating and cooling to which the penetration assembly is exposed during use. Because there is a great difference in the coefficients of thermal expansion of the metal members (i.e. the pipe 2 and the flange 4) and the resinous seal materials 3 and 5 with which the metal members contact, significant thermal stresses develop in the seal materials 3 and 5. Over a period of time, these repeated thermal stresses can result in cracks and other unacceptable defects in the seal materials 3 and 5 which destroy their effectiveness.

Another problem with this type of penetration assembly is that the epoxy or silicone resins which make up the seal materials 3 and 5 are subject to degradation by radiation, making them unusable over a long period.

SUMMARY OF THE INVENTION

It is the object of the present invention to provide a penetration assembly for an optical fiber cable having greater resistance to radiation than presently existing penetration assemblies.

It is a further object of the present invention to provide a penetration assembly having a seal portion which is not subject to cracks due to heat stress.

The first object is achieved by comprising the seal portion of the present penetration assembly of glass and metal, which have greater resistance to radiation than do the resinous materials normally used for sealing.

The second object is achieved by composing the glass part of the seal of a number of sections each having a different coefficient of thermal expansion having a value between that of the optical fiber cable and that of the metal part of the seal portion. In this manner, the coefficient of thermal expansion of the glass part of the seal changes gradually in a step-wise manner from a value close to that of the optical fiber cable to which one end is attached, to a value close to that of the metal part of the seal to which the other end of the glass part of the seal is connected. Thus, during both cooling and heating of the penetration assembly, the thermal stresses applied to any section of the glass part of the seal are minimized and cracks are prevented.

A penetration assembly for an optical fiber cable according to the present invention comprises a pair of axially aligned sleeves, an optical fiber cable centrally disposed inside the sleeves, a pair of open-ended flexible metal connectors having an annular cross section, each of which is concentrically disposed in one of the sleeves about the optical fiber cable and has the entire circumference of one of its ends rigidly secured to the inner surface of the sleeve housing it, and a pair of glass connectors having an annular cross section, each of which is concentrically disposed about the optical fiber cable in one of the sleeves and has the entire circumference of one end rigidly secured to one end of one of the flexible metal connectors and has the entire circumference of the other end rigidly secured to the optical fiber cable.

DESCRIPTION OF THE PREFERRED EMBODIMENTS

Hereinbelow will be described two embodiments of a penetration assembly for an optical fiber cable according to the present invention while making reference to FIGS. 2 through 4.

Figure 2:
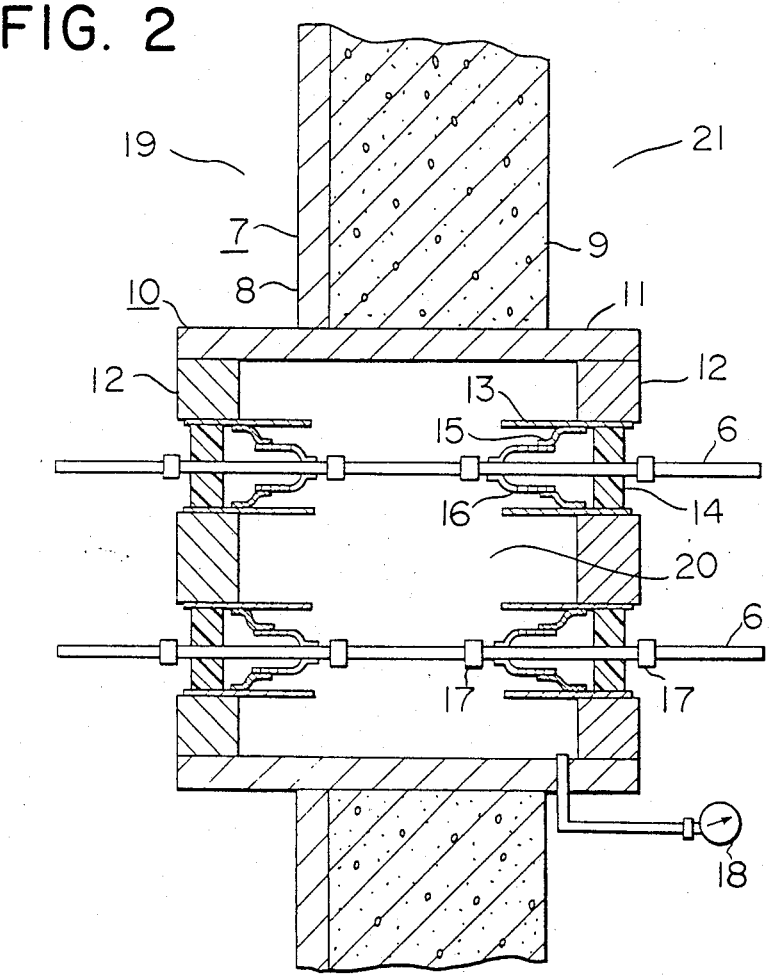
FIG. 2 is a cross-sectional elevation of one embodiment of a penetration assembly for an optical fiber cable according to the present invention as installed in the wall of the containment vessel of a light water reactor.

FIG. 2 shows a first embodiment of the present invention installed in the wall of the containment vessel of a light water reactor. The containment vessel 7 comprises an inner metal wall 8 and an outer concrete wall 9 in which a hole has been formed for the installation of a penetration assembly 10 according to the present invention. An open-ended outer cylindrical tube 11 forms an enclosure for the penetration assembly 10. A pair of metal end bulkheads 12 are welded with air-tight welds to opposite ends of the outer cylindrical tube 11. Each end bulkhead 12 is formed with a through hole. A metal sleeve 13 is welded or brazed to the inside surface of the through hole of each end bulkhead 12 so as to form an air-tight connection. An annular spacer 14 made of fiberglass reinforced plastic or a similar material fits into each of the sleeves 13. Each spacer 14 has a through hole through which loosely passes an optical fiber cable 6.

An open-ended skirt-shaped flexible metal connector 15 and a glass connector 16 together form an air-tight seal between the inside 19 of the containment vessel 7 and the inside 10 of the penetration assembly 20, and between the inside 20 of the penetration assembly 10 and the outside 21 of the containment vessel 7. The flexible metal connector 15 has an annular cross section concentrically disposed about the optical fiber cable 6. One end of each flexible metal connector 15 is welded with air-tight welds about its entire circumference to the inside surface of one of the sleeves 13. Like the flexible metal connector 15, the glass connector 16 has an annular cross section and concentrically surrounds the optical fiber cable 6. One end of each glass connector 16 is rigidly connected along its entire circumference to the optical fiber cable 6 so as to form an air-tight seal, and the other end is rigidly connected along its entire circumference to a flexible metal connector 15, also so as to form an air-tight seal.

Each flexible metal connector 15 comprises a metal having a coefficient of thermal expansion very near to that of the optical fiber cable 6, such as "Kovar", which is a trademark of Westinghouse Electric Company, formed into the shape of a skirt.

Figure 3:
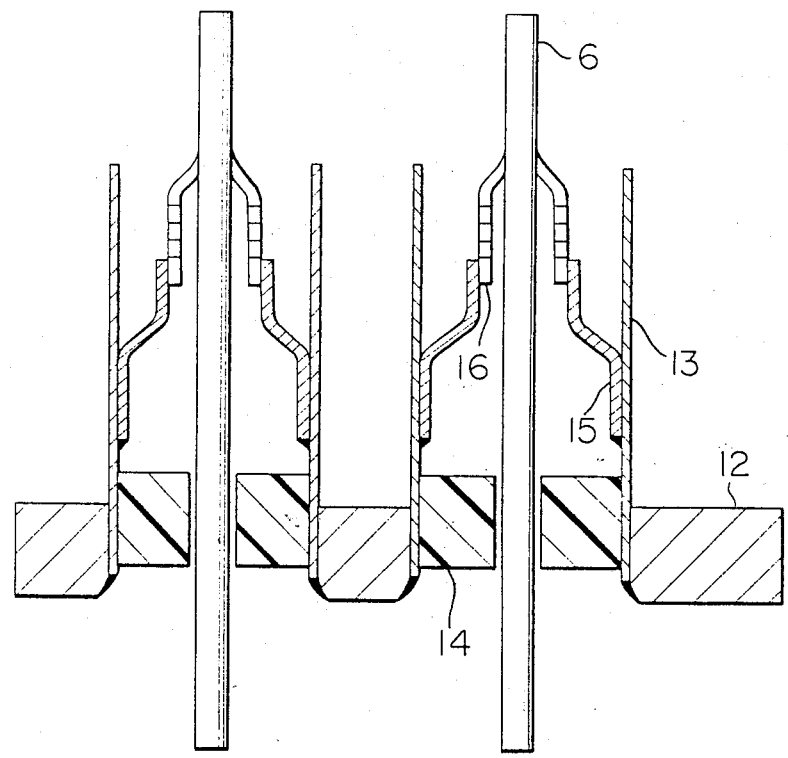
FIG. 3 is an enlarged cross-sectional view of a portion of the embodiment shown in FIG. 2.

As can be seen from the enlarged view in FIG. 3, each glass connector 16 is made of a plurality of cylindrical sections. Each section has a different coefficient of thermal expansion having a value between that of the flexible metal connector 15 and that of the optical fiber cable 6. For example, in the present embodiment, the coefficients of thermal expansion of the cylindrical sections are $10 \times 10^{-7}$, $20 \times 10^{-7}$, $25 \times 10^{-7}$, $30 \times 10^{-7}$, and $38 \times 10^{-7}$ cm/cm/°C. The present embodiment uses 5 cylindrical sections for each glass connector 16, but the number of sections may be varied. The sections are arranged in order of coefficient of thermal expansion, with the section having the lowest coefficient of thermal expansion being connected to the optical fiber cable 6, and with the section having the highest coefficient of thermal expansion being connected to the flexible metal connector 15.

Couplings 17 are provided for connecting adjacent optical fiber cables 6. A pressure gauge 18 fits into a through hole formed in the outer cylindrical tube 11. The inside 20 of the penetration assembly 10 is filled with a radiation resistant, chemically stable gas such as dry $N_2$. By filling the penetration assembly with such a gas, the integrity of the seal formed between the inside 19 and the outside 21 of the containment vessel 7 can be ascertained merely by reading the gauge 18. The gas further serves to prevent the absorption of moisture by the optical fiber cable 6 and the glass connector 16.

The entire penetration assembly 10 as shown in FIG. 2 can be factory assembled and then installed in the wall of a containment vessel 7 by field welding the outer cylindrical tube 11 to the metal wall 8 forming the inside of the containment vessel 7.

Figure 1:
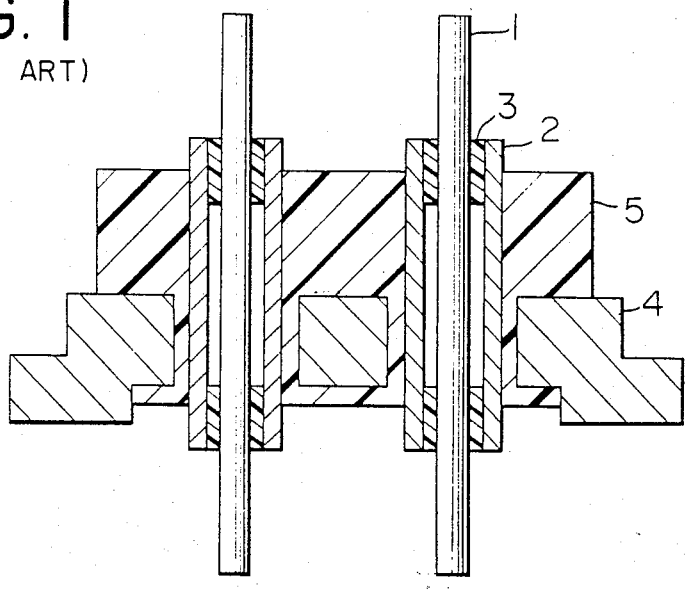
FIG. 1 is a longitudinal cross-sectional view of one type of presently used penetration assembly for an optical fiber cable.

Unlike resins, glass is not subject to degradation by radiation, and thus the glass connector 16 used in the present invention forms a more effective, longer lasting seal than do the seals made of epoxy or silicone resins used in penetration assemblies like the one shown in FIG. 1.

In the conventional penetration assembly shown in FIG. 1, the seal members 3 and 5 contact with metal members having coefficients of thermal expansion far greater than the coefficients of thermal expansion of the seal members 3 and 5. This difference in coefficient of thermal expansion results in thermal stresses large enough to cause cracks in the seal members 3 and 5.

However, in the present invention, the coefficient of thermal expansion of the glass connector 16 increases gradually in a step-wise manner from the section in contact with the optical fiber cable 6 to the section in contact with the flexible metal connector 15. Accordingly, there is but a small difference between the coefficients of thermal expansion of adjacent sections of the glass connector 16; there is but a small difference between the coefficient of thermal expansion of the end section of the glass connector 16 and that of the optical fiber cable 6; and there is but a small difference between the coefficient of thermal expansion of the end section of the glass connector 16 and that of the flexible metal connector 15, with the result that the thermal stresses acting on any section of the glass connector 16 are minimized, and cracks or other defects are prevented.

The glass connector 16 is further protected from physical damage by the skirt-like shape of the flexible metal connector 15. This shape serves to cushion the glass connector 16 by partially absorbing externally-applied forces and vibrations.

The cylindrical sections making up the glass connectors 16 are arranged along the same longitudinal axis rather than being concentrically aligned in the radial direction between the optical fiber cable 6 and the flexible metal connector 15. This manner of longitudinal alignment is not only more effective in preventing cracks due to heat stresses, but it is also simpler from a manufacturing standpoint than is concentric, radial alignment.

Figure 4:
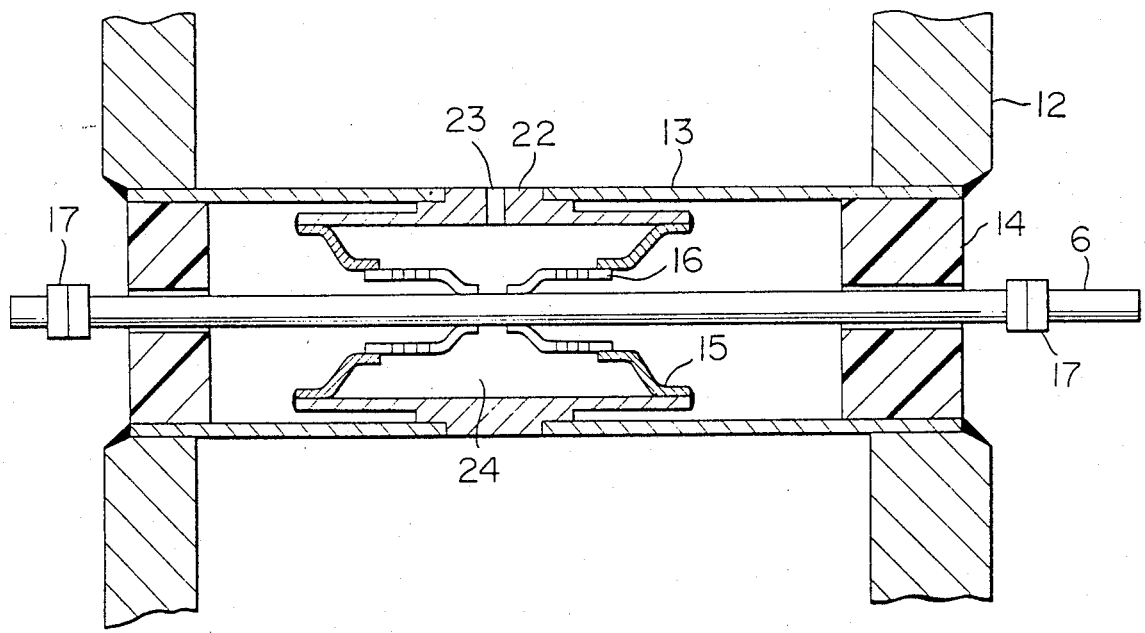
FIG. 4 is a cross-sectional elevation of one portion of a second embodiment of a penetration assembly for an optical fiber cable according to the present invention.

FIG. 4 shows a partial cross-sectional view of a second embodiment of a penetration assembly according to the present invention. This second embodiment is similar to the first embodiment, and although not shown in FIG. 4, it includes an outer cylindrical tube 11 forming an enclosure for the penetration assembly, as does the first embodiment. However, in the first embodiment, the two confronting sleeves 13 surrounding each optical fiber cable 6 are separated from one another, while in this second embodiment, they are connected together by an open-ended cylindrical sleeve connector 22. The sleeve connector 22 is connected to two confronting sleeves 13 so as to form an air-tight seal between them. Whereas in the first embodiment of FIGS. 2 and 3 the flexible metal connectors 15 are connected to the sleeves 13, in this second embodiment the flexible metal connectors 15 are connected with air-tight welds to the ends of the sleeve connector 22. A through hole 23 is formed in the sleeve connector 22 for the insertion of a pressure gauge. The inner cavity 24 formed between the sleeve connector 22 and the optical fiber cable 6 is filled with dry $N_2$ or other appropriate gas. As in the first embodiment, the gas prevents the absorption of moisture by the optical fiber cable 6 and by the glass connector 16, and by measurement of the pressure of the gas, the integrity of the seal can be easily ascertained.

By connecting a pair of confronting sleeves 13 with a sleeve connector 22, the optical fiber cable 6 housed therein can be better protected from physical damage. In particular, the resistance to earthquakes can be increased.

This second embodiment is also advantageous from the standpoint of light transmission, with couplings 17 between adjacent sections of the optical fiber cable 6 reduced from 4 locations to 2 locations.

In addition, maintenance is simplified by connecting confronting sleeves 13 together. In the event that some repair needs to be made to either the section of optical fiber cable 6 inside the penetration assembly 10 or to one of the parts forming the penetration assembly 10, both sleeves 13 and the parts contained therein can be removed from the penetration assembly 10 as a single unit.

While both of the embodiments of a penetration assembly according to the present invention were described as used in a light water reactor, they are both appropriate for use in other types of reactors, such as heavy water reactors and fast breeder reactors.

Further, although the present invention was described for use with optical fiber cables, it my also be used as a penetration assembly for optical fiber rods.

What is claimed is:

1. A penetration assembly for bringing optical fiber cable through a wall comprising:

first and second axially aligned sleeves having inner surfaces;

an optical fiber cable segment centrally disposed inside said first and second sleeves; said optical cable segment having opposite ends for being connected to optical fiber cables on opposite sides of a wall;

first and second open-ended flexible metal connectors, having respective annular cross-sectional areas and being concentrically disposed about said optical fiber cable segment, respectively inside said first and second sleeves; said first metal connector having first and second axially opposite metal connector ends, said first metal connector end having a first metal connector circumference surrounding said cable segment and rigidly secured over the entire extent thereof to said first sleeve, said second metal connector having third and fourth axially opposite metal connector ends, said fourth metal connector end having a second metal connector circumference surrounding said cable segment and rigidly secured over the entire extent thereof to said second sleeve; and first and second open-ended glass connectors, having respective annular cross sections and being concentrically disposed about said optical fiber cable segment, respectively inside said first and second sleeves; said first glass connector having first and second axially opposite glass connector ends, said first and second glass connector ends having respective first and second glass connector circumferences surrounding said cable segment and respectively rigidly secured over the entire extents thereof to said second metal connector end and to said cable segment; said second glass connector having third and fourth axially opposite glass connector ends, said third and fourth glass connector ends having respective third and fourth glass connector circumferences surrounding said cable segment and being respectively rigidly secured over the entire extents thereof to said third metal connector end and to said cable segment.

2. A penetration assembly as in claim 1, wherein:

each of said first and second flexible metal connectors is formed of a metal having a coefficient of thermal expansion close to that of said optical fiber cable segment; and each of said first and second glass connectors comprises a plurality of cylindrical sections each having a different coefficient of thermal expansion having a value between the coefficient of thermal expansion of said optical fiber cable segment and the coefficient of thermal expansion of said metal.

3. A penetration assembly as in claim 2, wherein said plurality of cylindrical sections forming each of said first and second glass connectors are arranged in axial progression in order of coefficient of thermal expansion, with the section having the lowest coefficient of thermal expansion being directly connected to said optical fiber cable segment.

4. A penetration assembly as in claim 3, further comprising:

an outer cylindrical tube surrounding said first and second sleeves for fitting in an opening in the wall; and first and second end bulkheads rigidly secured to opposite ends of said outer cylindrical tube, said first and second end bulkheads being formed with respective first and second through holes to the respective inside surfaces of which are respectively attached said first and second sleeves.

5. A penetration assembly as in claim 4, wherein said outer cylindrical tube has a circumference formed with a through hole for the insertion of a gas pressure gauge.

6. A penetration assembly as in claim 3, further comprising an open-ended cylindrical sleeve connector rigidly secured to said first and second sleeves so as to form an air-tight connection between said first and second sleeves.

7. A penetration assembly for an optical fiber cable as in claim 6, wherein said first and fourth metal connector ends of said first and second flexible metal connectors is rigidly secured about their respective entire first and second circumferences to respective opposition ends of said sleeve connector.

8. A penetration assembly as in claim 7, further comprising:

an outer cylindrical tube surrounding said first and second sleeves for fitting in an opening in the wall; and first and second end bulkheads rigidly secured to opposite ends of said outer cylindrical tube, said first and second end bulkheads being formed with respective first and second through holes to the respective inside surfaces of which are respectively attached said first and second sleeves.

9. A penetration assembly as in claim 8, wherein said sleeve connector has a circumference formed with a through hole for the insertion of a pressure gauge.

10. A penetration assembly as in claim 1, wherein said first and second metal connectors are supported only at said first, second, third and fourth metal connector ends and comprise means for cushioning said first and second glass connectors by partially absorbing any externally-applied forces and vibrations.

11. A penetration assembly as in claim 1, wherein said first and fourth metal connector ends are respectively rigidly secured over the entire extents thereof to inner surfaces of said first and second sleeves.

* * * * *